United States Patent [19]

Killian

[11] 4,079,746

[45] Mar. 21, 1978

[54] VALVE ASSEMBLY HAVING ADAPTER MEANS

[75] Inventor: Henry R. Killian, Sugarland, Tex.

[73] Assignee: Keystone International, Inc., Houston, Tex.

[21] Appl. No.: 644,125

[22] Filed: Dec. 24, 1975

[51] Int. Cl.² .............................................. F16k 43/00
[52] U.S. Cl. .................................. 137/315; 251/148; 285/363
[58] Field of Search ................. 137/315, 454.2, 454.6; 251/148, 151, 152, 305, 306, 308, 304, 307, 309; 138/94, 94.3; 285/363

[56] References Cited

U.S. PATENT DOCUMENTS

| | | | |
|---|---|---|---|
| 2,647,732 | 8/1953 | Jarman | 285/363 |
| 2,936,778 | 5/1960 | Stillwagon | 137/454.6 |
| 2,994,342 | 8/1961 | Stillwagon | 137/454.2 |
| 3,072,139 | 1/1963 | Mosites | 137/454.2 |
| 3,202,175 | 8/1965 | Dumm | 137/315 |
| 3,425,439 | 2/1969 | Duffey et al. | 251/306 |
| 3,503,415 | 3/1970 | DeAngelis et al. | 251/151 |
| 3,643,983 | 2/1972 | Ludeman | 285/363 |
| 3,648,723 | 3/1972 | Nelson et al. | 137/454.6 |
| 3,743,242 | 7/1973 | Scaramucci | 137/454.2 |

*Primary Examiner*—William R. Cline
*Assistant Examiner*—G. L. Walton
*Attorney, Agent, or Firm*—Browning, Bushman & Zamecki

[57] ABSTRACT

A wafer valve assembly for securing between two flange fittings, each of the flange fittings having a flow passageway therethrough and comprising an annular flange extending radially from the flow passageway. The valve assembly comprises a valve body having a flowway therethrough and a valve element mounted in the flowway for movement between a first position closing the flowway and a second position opening the flowway. Adapter means are secured to the valve body, and alignment means cooperate between the adapter means and the flanges to place the flow passageways and the flowway in substantial register.

10 Claims, 9 Drawing Figures

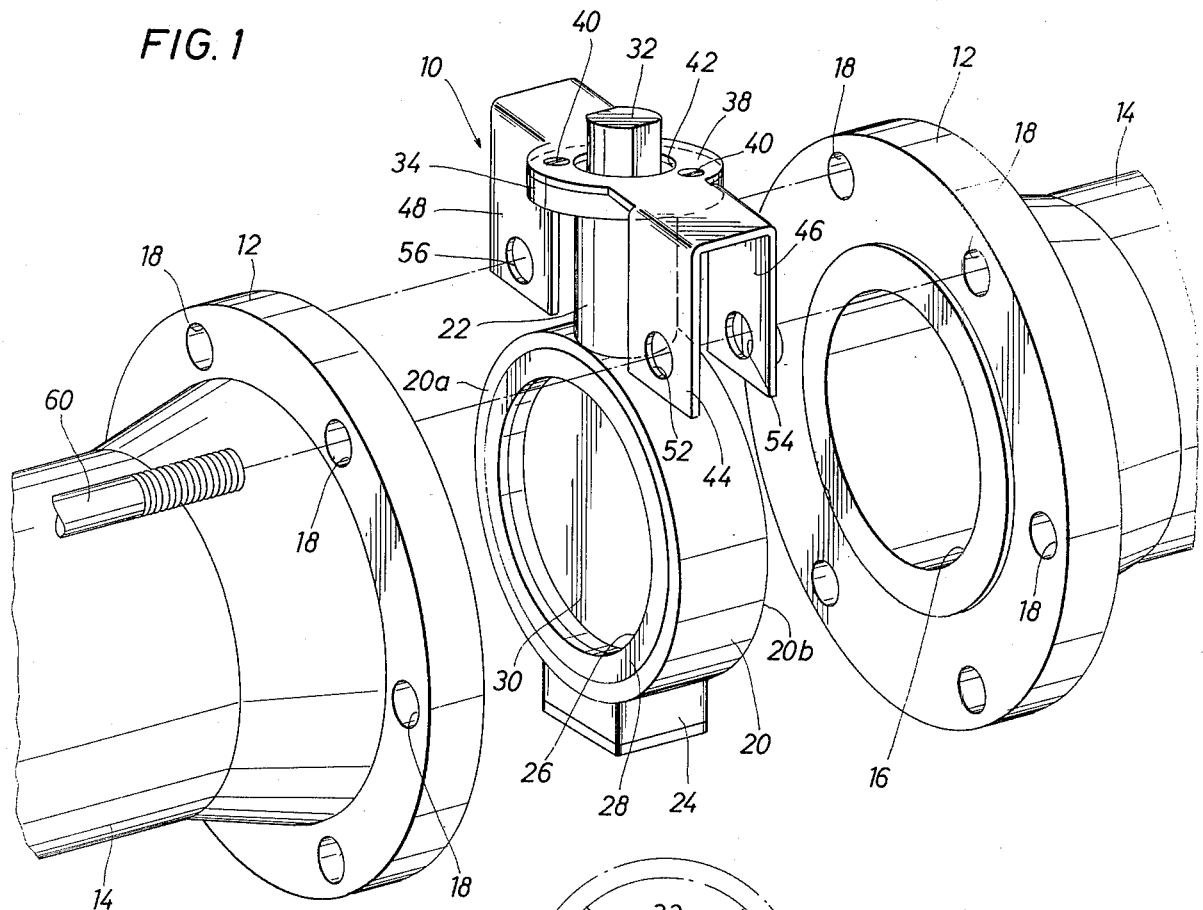
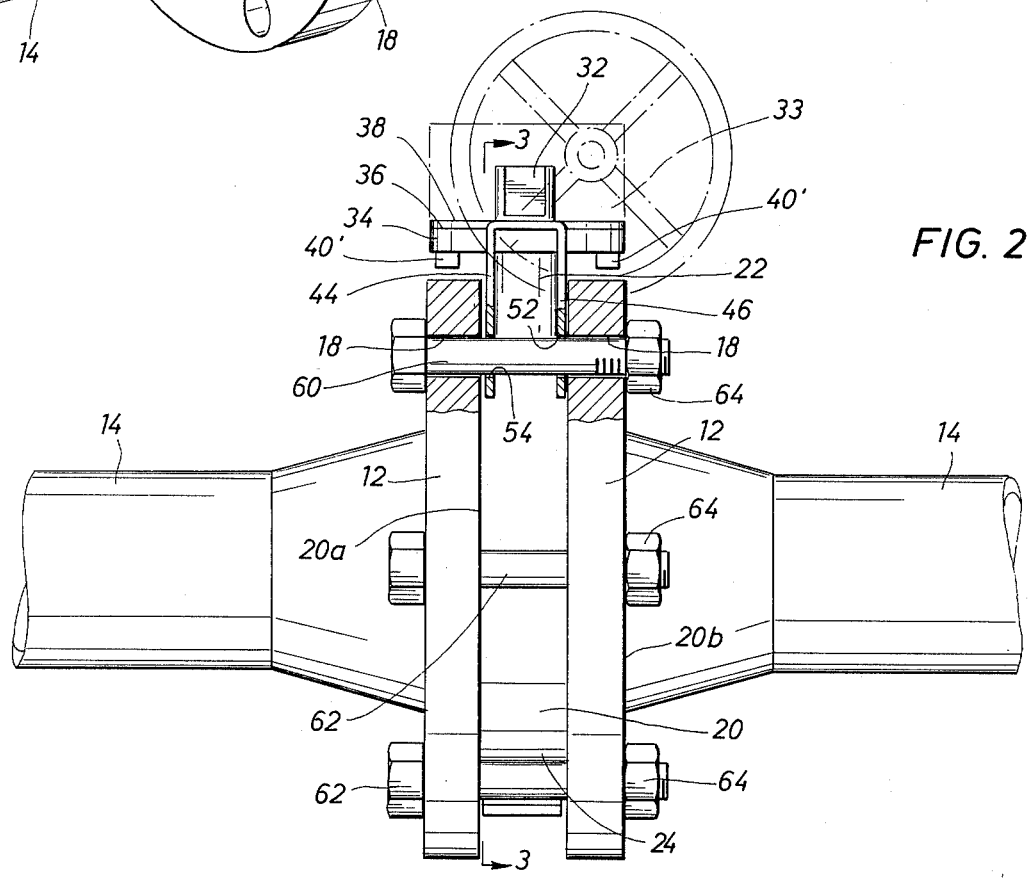

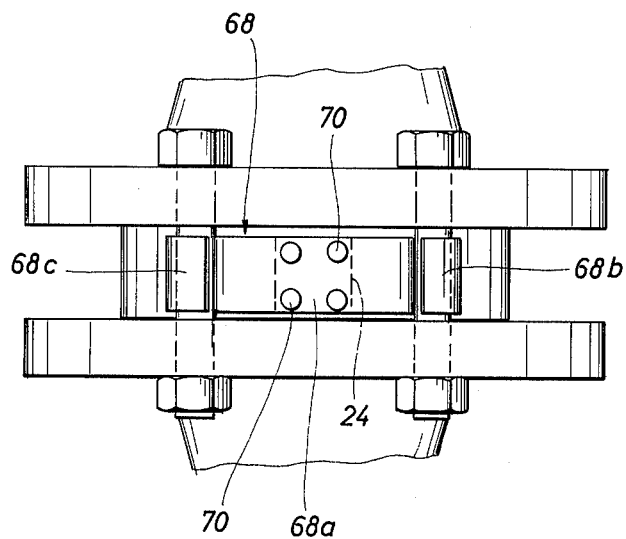
FIG. 6
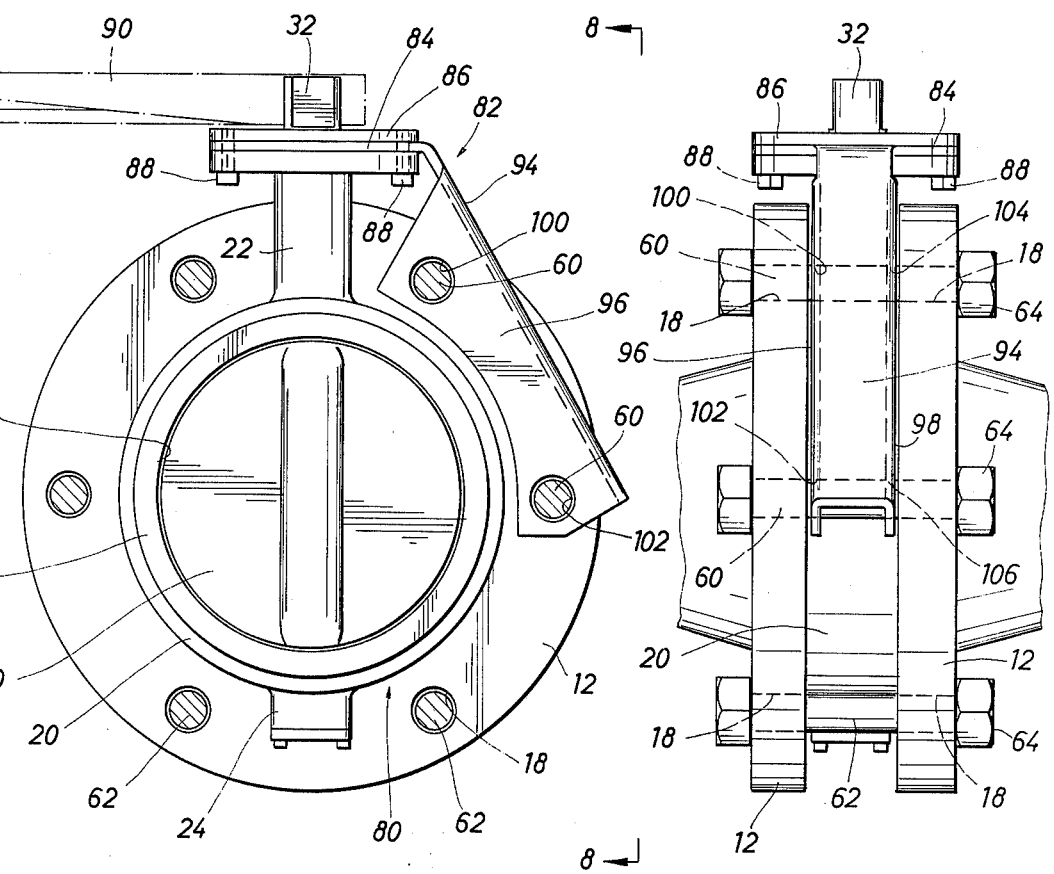
FIG. 7
FIG. 8

VALVE ASSEMBLY HAVING ADAPTER MEANS

BACKGROUND OF THE INVENTION

1. Field of the Invention

The present invention pertains to wafer-type valves such as butterfly valves. Such valves typically include a relatively thin generally cylindrical valve body which is connected into a pipe line by being clamped between two flange fittings. The valve body has a flowway therethrough and a valve element, usually generally disc-shaped, is mounted in the flowway for movement from a closed valve position in which it lies transversely across the flowway to an open valve position in which it opens the flowway. The valve movement is usually rotation about an axis extending generally transversely across the flowway. Thus in the open valve position, the valve element lies generally parallel to the flowway centerline and extends beyond the axial extremities or end faces of the valve body.

2. Description of the Prior Art

In the past, some wafer valves of the type described above have had holes formed in their valve bodies for receipt of stud members such as bolts which also extend between the flange fittings to clamp the latter together. The placement of the studs through the holes in the valve body would serve to center the valve in place until the flange fittings could be firmly secured. Where the valve element is of the rotary type, such centering is necessary because the flowway through the valve body must be perfectly aligned with the flow passageways of the flange fittings and adjacent pipes in order to prevent interference between the valve element and the flanges during movement of the valve element between the closed and open positions. However, centering may also be desired in valve assemblies having valve elements other than rotary discs.

Problems arise in that the various flange fittings with which a particular type of valve will be used are not uniform. In particular, the size, number, and spacing of the stud members vary. In the past, it has been necessary to manufacture valves of one basic type in a number of forms each designed to be used with a particular type of flange fitting. The manufacture of various forms of a single basic type of valve body is not only unduly expensive, but still fails, in at least some cases, to ensure that all the types of flange fittings which may be encountered in the field can be properly accommodated.

In other prior wafer valves no holes are provided in the valve body. Instead, the valve body is centered between the flange fittings either manually or by means of a suitable tool. Centering the valve is this manner is extremely difficult and often results in an assembly in which the valve flowway is imperfectly aligned with the flow passageways in the flange fittings Consequently, a rotary disc valve member may jam against the flange fittings when it is rotated from closed to open positions, or other problems may result.

SUMMARY OF THE INVENTION

The present invention provides a valve assembly in which the valve body proper need have no bolt-receiving holes therein and yet can be easily aligned with the flange fittings. The manufacture of the valve body is thus less complicated and expensive than would be the manufacture of even one form of apertured valve body. The assembly further comprises an adapter means which is secured to the valve body. The assembly also includes alignment means cooperative between the adapter means and the flanges to place the flow passageways of the flange fittings and the flowway of the valve body in substantial register or alignment. The alignment means preferably comprises at least two stud members such as blots extending between the flanges and engaged by the adapter means. The adapter means may include means defining throughways for receipt of the stud members. A number of different forms of adapters can be provided for a given type of valve, each adapter means having its throughways sized and spaced to easily provide perfect alignment of the valve with a particular type of flange fitting. The adapter means can be used not only with new valve designs specifically intended to employ the adapter means but also with conventional valves which are either designed to fit only one type of flange fitting or which have no alignment means and are thus difficult to position.

In use, when the type of flange fitting with which the valve will be used has been determined, the corresponding adapter means is chosen and secured to the valve body. The adapter is preferably removable so that it can later be replaced with another type if necessary. The adapters are inexpensive to manufacture. In the preferred embodiments they can be easily formed of plate metal and, in some cases, welded-on studs This fact, coupled with the fact that the simplified valve body proper is also cheaper to manufacture than prior valve bodies with holes therein, represents a considerable economic advantage in the use of the present invention. Furthermore, the invention allows for maximum versatility in a particular type of valve without the time consuming task of trying to align a valve having no alignment holes in the body between the flange fittings so that the valve flowway and flange fitting flow passageways register.

Accordingly it is a principal object of the present invention to provide a wafer-type valve assembly comprising adapter means and means cooperative with its adapter means for aligning the valve between flange fittings.

Another object of the invention is to provide a wafer-type valve assembly with maximum adaptability to various types of flange fittings.

Still another object of the invention is to provide perfect alignment of a wafer-type valve flowway with the adjacent flange fitting flow passageways.

A further object of the invention is to provide a high quality wafer-type valve which is less expensive to manufacture than conventional wafer valves with alignment holes in their valve bodies.

Other objects, features and advantages of the invention will be made apparent by the following description of the preferred embodiments, the drawings, and the claims.

BRIEF DESCRIPTION OF THE DRAWINGS

FIG. 1 is an exploded perspective view of a valve assembly according to the invention with the flange fittings between which it is received.

FIG. 2 is a side elevational view of the assembled apparatus of FIG. 1 with parts broken away and with an actuator shown in phantom.

FIG. 6 is a bottom plan view of the valve assembly of FIG. 5 taken on lines 6—6 thereof.

FIG. 7 is a view similar to those of FIGS. 3 and 5 showing another form of adapter.

FIG. 8 is a side elevational view taken on lines 8—8 of FIG. 7.

DESCRIPTION OF THE PREFERRED EMBODIMENTS

Figure 3:
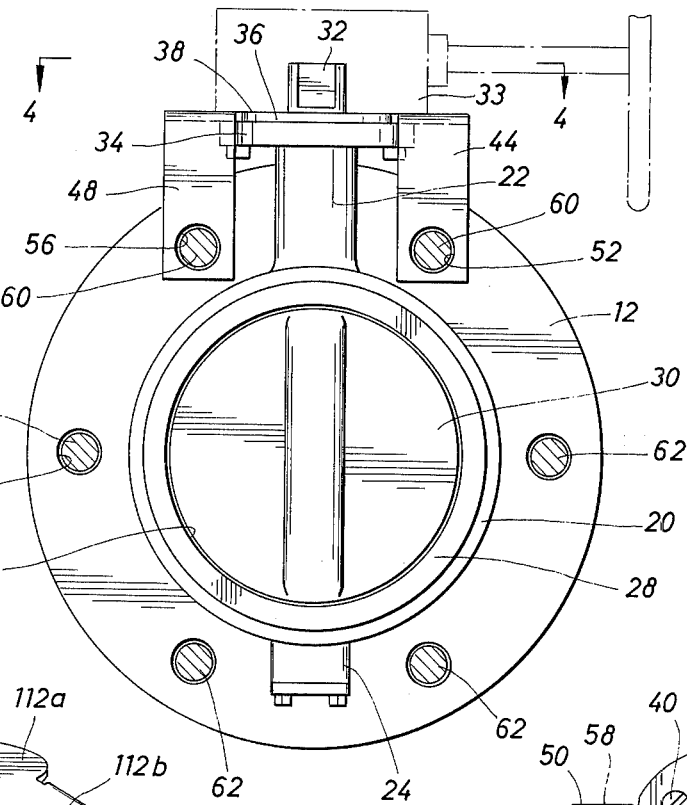
FIG. 3 is an end elevational view of the valve assembly and one flange fitting taken on lines 3—3 of FIG. 2.

Referring now to FIGS. 1-4, there is shown a wafer-type valve assembly generally indicated by the numeral 10. Valve assembly 10 is held in place in a pipe line by being clamped between two flange fittings each comprised of an annular radially extending flange 12 formed or otherwise suitably affixed on the end of a pipe 14. Each of the flanges 12 and its connected pipe 14 form a respective flow passageway 16.

The valve assembly 10 includes a valve body having a cylindrical main portion 20 and upper and lower peripheral portions or bosses, 22 and 24 respectively, extending generally radially from the main portion 20. A generally cylindrical valve seat 28 is disposed in the main portion 20 of the valve body and defines a flowway 26 through the valve body. When the valve assembly 10 is properly aligned between the flanges 12, the flowway 26 is in substantial register with the flow passageways 16. Unless otherwise noted, terms such as "radial," "longitudinal," "axial," etc. will be used herein with reference to the centerline of the flowway 26. Flanges 12 have a plurality of bores 18 extending longitudinally therethrough. Bores 18 are spaced circumferentially around the flanges 12 and each bore 18 on one of the flanges 12 is aligned with a matching bore 18 on the other flange 12. A bolt 60 or 62 extends through each such pair of matching bores 18 and nuts 64 are placed on the ends of the bolts to clamp the valve assembly between the flanges 12.

Valve assembly 10 further comprises a disc-like valve element 30 rotatably mounted in the flowway 26 for rotation about an axis which extends diametrically across the flowway, specifically through the centerlines of the upper and lower bosses 22 and 24 of the valve body. In particular, the valve element 30 has upper and lower trunnions (not shown) extending radially therefrom into respective ones of the bosses 22 and 24 of the valve body and rotatably mounted therein. The valve assembly 10 also includes a valve stem 32 which is attached to valve element 30 and extends through the upper boss 22. The outer end of the valve stem 32 can thus be engaged by suitable actuator means 33 or by a hand operated handle or the like to rotate the valve element 30 between a closed valve position in which it extends transversely across the flowway 26 and an open valve position in which it extends generally along the flowway axis. In the latter position, the valve element 30 extends axially beyond the end faces 20a and 20b of the main portion 20 of the valve body. Thus, the flowway 26 must be in substantial register with the flow passageways 16 to prevent the valve element 30 from jamming against the flanges 12 when moved from its closed valve position to its open valve position.

Figure 4:
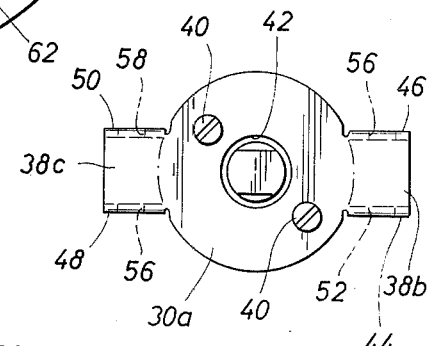
FIG. 4 is a top plan view of the adapter taken on lines 4—4 of FIG. 3.

The upper boss 22 of the valve body has an annular flange 34 at its outer end extending radially with respect to the axis of rotation of the valve element 30. Flange 34 provides a flat outer end surface 36 of peripheral portion 22. The valve assembly further comprises an adapter having a plate-like connection portion 38 which overlies surface 36 and which is secured to flange 34. Connection portion 38 may be secured to flange 34 by screws 40 as shown in FIG. 1, or the connection portion 38 and an overlying actuator 33 may be secured to the flange 34 by common bolts 40' as shown in FIGS. 2 and 3. As best seen in FIG. 4, the connection portion 38 of the adapter has a generally circular central area 38a which generally matches the flange 34 and which has a central opening 42 for non-interfering receipt of the rotary valve stem 32. Connection portion 38 also includes two wings 38b and 38c extending laterally outwardly on opposite sides of the central area 38a.

The adapter further comprises two plate-like parallel, longitudinally spaced apart tabs 44 and 46 extending downwardly toward body portion 20 from wing 38b and two more plate-like, parallel, longitudinally spaced-apart tabs 48 and 50 extending downwardly from wing 38c. Each of the tabs 44, 46, 48, and 50 faces generally axially with respect to the centerline of the flowway 26 and has a respective aperture 52, 54, 46, or 58 longitudinally therethrough. The apertures 52 and 54 of aligned tabs 44 and 46 are also aligned as are the apertures 56 and 58 of aligned tabs 48 and 50.

Since the longitudinal distance between tabs 44 and 46 is substantially the same as the longitudinal extent of the main portion 20 of the valve body (see FIG. 2) the apertures 52 and 54 together define a longitudinal throughway in the adapter whose effective length is substantially equal to that of main portion 20. Similarly, apertures 56 and 58 define a throughway having an effective length substantially as great as the longitudinal extent of main portion 20 of the valve body. While such effectively extending throughways are preferred, it may be sufficient in some instances to employ shorter throughways as by simply providing a single pair of tabs, such as 44 and 48, with their apertures 52 and 56 defining the two throughways.

The adapter shown in FIGS. 1-4 is designed for use with the flange fittings also shown in those figures. Thus when apertures 52 and 54 are aligned with one of the bores 18 on each of the flanges 12, the other two apertures 56 and 58 can be aligned with two other bores 18, one on each of the flanges 12, and flowway 26 will then be in substantial register with flow passageways 16. Bolts 60 are then placed through each set of aligned adapter apertures and bores 18 to perfectly align the valve assembly with the flange fittings and hold the valve in place while other bolts 62 are placed through the remaining pairs of aligned bores 18 in the flanges 12. Flanges 12 are then clamped tightly together with the valve assembly 10 therebetween by placing a nut 64 on the end of each bolt 60 or 62 and tightening the bolts 64.

Figure 5:
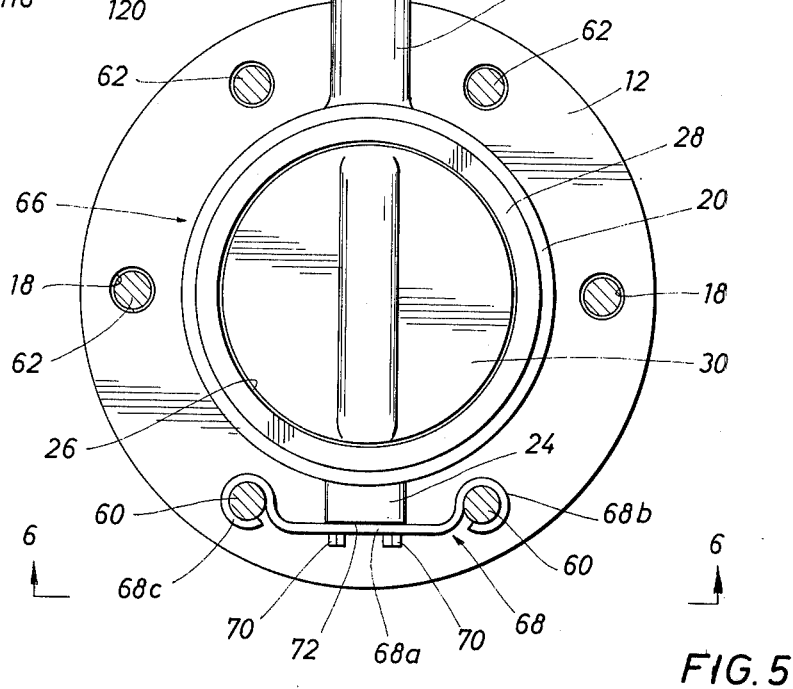
FIG. 5 is a view similar to that of FIG. 3 showing another form of adapter.

Referring now to FIGS. 5 and 6 there is shown a second embodiment of the invention comprising a valve assembly 66. With the exception of its adapter 68, assembly 66 and the attached flange fittings, bolts, etc. are substantially identical to those of the embodiment of FIGS. 1-4. Accordingly, analogous parts of the two embodiments have been given like reference characters.

Briefly, the apparatus of FIGS. 5 and 6 comprises a value assembly having a valve body comprised of a main portion 20 and upper and lower peripheral portions or bosses 22 and 24. The assembly further comprises a valve element 30 rotatably mounted in the flowway 26 of the valve body, a generally cylindrical valve seat 28, and a rotary valve stem 32 attached to the valve element 30. The valve assembly 66 is clamped between two flanges, one of which is shown at 12, having aligned bores 18 and clamped together by bolts 60 and 62 extending through aligned pairs of the bores 18 in the two flanges 12.

The adapter 68 is formed of a flat plate-like connection portion 68a which abuts or overlies the outer surface 72 of lower boss 24 of the valve body. The adapter 68 extends laterally beyond portion 34 on opposite sides, and the sides of the adapter so extending are curved to form eyelets 68b and 68c. The eyelets 68b and 68c define respective longitudinal throughways whose lengths are substantially as great as the longitudinal extent of the main portion 20 of the valve body. A bolt 60 extends through each of these throughways as well as through an aligned bore 18 in each of the flanges 12.

FIGS. 7 and 8 show still another embodiment of the invention comprising a valve assembly 80. Those portions of assembly 80 and the attached apparatus which are substantially identical to the analogous parts of the embodiment of FIGS. 1-4 have been given like reference characters.

The apparatus of FIGS. 7 and 8 includes the valve assembly 80 comprising a valve body having a main portion 20 and upper and lower peripheral portions or bosses 22 and 24. A valve element 30 is rotatably mounted in the flowway 26 of the valve body, the flowway being defined by a generally cylindrical valve seat 28. A valve stem 32 attached to the valve element 30 extends upwardly through the upper boss 22. Assembly 80 is clamped between two flanges 12 having bores 18 and clamped together by bolts 60 and 62 extending through aligned pairs of the bores 18 and secured by nuts 64.

The valve assembly 80 includes an adapter 82 comprising a flat plate-like connection portion 84 overlying the outer end surface of boss 22. A stop plate 86 in turn overlies the connection portion 84 and both are secured to the flange 34 of boss 22 by screws 88. The end of valve stem 32 extends outwardly through boss 22, connection portion 84 and stop plate 86 and is engaged by a hangle shown in phantom at 90. Handle 90 includes a pivotal lock member 92 which fits into any one of a number of slots (not shown) in plate 86 to lock the valve element 30 in a desired position.

Adapter 82 further comprises a plate-like wing 94 extending laterally outwardly and downwardly from one side of connection portion 84. A pair of parallel aligned plate-like tabs 96 and 98 extend inwardly toward the main portion 20 of the valve body from wing 94. Each of the tabs faces axially and has a respective pair of apertures 100, 102 and 104, 106 longitudinally therethrough.

Apertures 100 and 104 are aligned with each other and with one of the pairs of aligned bores 18, while apertures 102 and 106 are aligned with each other and with another pair of aligned bores 18. Aligned apertures 100 and 104 form a first throughway and aligned apertures 102 and 106 form a second throughway, the effective longitudinal extent of these throughways being substantially as great as that of main portion 20 of the valve body. When bolts 60 are placed through respective ones of the throughways and aligned pairs of bores 18 as shown, the flowway 26 is in substantial register with the flow passageways in the flanges 12. The other bolts 62 may then be placed through the remaining paris of aligned bores 18 and all bolts secured by nuts 64.

Figure 9:
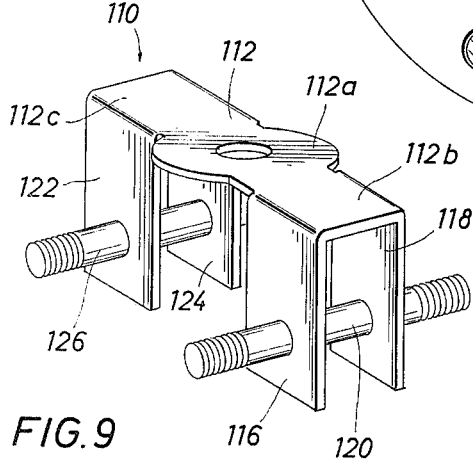
FIG. 9 is a detail view of a modification of the adapter of FIGS. 1-4.

In each of the above embodiments, the alignment means which place the flowway of the valve body and the flow passageways of the flange fittings in register comprises at least two stud members in the form of bolts received in throughways in the adapter and aligned bores in the flange fittings. FIG. 9 shows an embodiment of the invention in which the stud members are integral with the adapter. The adapter 110 of FIG. 9 is similar to the adapter of FIGS. 1-4 and comprises a plate-like connection portion 112 having a central portion 112a adapted to overlie the upper boss 22 of the valve body and a pair of wings 112b and 112c extending laterally from opposite sides of central area 112a. Each of the wings 112b and 112c has a pair of axially spaced tabs extending downwardly therefrom. The tabs 116 and 118 are shown extending from wing 112b. However, instead of merely an aperture extending through each of the tabs, there is a stud member 120 attached to the tabs extending longitudinally outwardly from each tab for disposition in a pair of aligned bores 18 of the flanges 12. The stud member 120 is welded to the tabs and has threaded outer ends for receipt of suitable nuts. Wing 112c has similar tabs 122 and 124 extending downwardly therefrom. A stud member 126, substantially identical to stud 120, is affixed to tabs 122 and 124. The stud members may be continuous ones as shown extending between two aligned tabs, or they may be broken studs, each comprising two stub pins each extending longitudinally outwardly from a respective one of the two aligned tabs.

It can be seen that in either of the first two embodiments shown, the adapter can be easily formed of plate metal while in the third embodiment it can be formed of plate metal and welded-on studs. In any case, manufacture of the adapter involves little expense. It can also be seen that any of the adapters can be replaced with another whose throughways or studs are differently sized and/or spaced to fit different flange fittings. Furthermore, the valve body 20, 22, 24 itself is less expensive to manufacture than prior wafer valve bodies since there is no need to provide bolt receiving holes therethrough. The adapter means of the invention can be applied to conventional valve bodies to make them more versatile or easier to position.

Many modifications of the preferred embodiments can be made without departing from the spirit of the invention. For example, more than two throughways or stud members may be provided in the adapter means. Similarly, while the adapter means in the preferred embodiments are formed in a single piece, there could be a plurality of adapter parts secured to the valve body and each defining one or more throughways or providing one or more studs. Additionally, many variations could be made in the precise configuration of the adapter means. Accordingly it is intended that the scope of the invention be limited only by the claims which follow. I claim:

1. In combination with a wafer-type valve assembly for securing between two flange fittings, each of said flange fittings having a flow passageway extending longitudinally therethrough and comprising an annular flange extending radially from said flow passageway, wherein said valve assembly comprises a valve body including a main portion defining a flowway therethrough and a peripheral portion extending generally radially outwardly from said main portion and having a connection surface and said valve assembly further comprising a valve element mounted in said flowway for movement between a first position closing said flowway and a second position opening said flowway:

adapter means removably secured to said peripheral portion of said valve body and including a connection portion engageable with said connection surface and extension means depending from said connection portion and defining at least two throughways; means for securing said connection portion to said connection surface; and alignment means cooperative between said adapter means and said flanges for placing said flow passageways and said flowway in substantial register, said alignment means comprising at least two stud members extending between said flanges generally parallel to the centerline of said flowway and each received in a respective one of said throughways.

2. The combination of claim 1 wherein said valve element is rotatable about an axis extending generally transversely across said flowway and said peripheral portion of said valve body extends along the axis of rotation of said valve element.

3. The combination of claim 1 wherein said connection portion is a plate-like member extending across said connection surface of said peripheral portion of said valve body.

4. The combination of claim 3 including a valve stem connected to said valve element and having an end portion extending outwardly through said peripheral portion of said valve body and wherein said plate-like member has an opening for non-interfering receipt of said valve stem.

5. The combination of claim 3 wherein said extension means comprises a plate-like tab extending generally inwardly toward said main portion of said valve body and having two apertures therethrough, each of said apertures at least partially defining a respective one of said throughways.

6. The combination of claim 5 wherein said extension means further comprises a second plate-like tab aligned with and longitudinally spaced from said first tab and having two apertures therethrough each aligned with a respective one of the apertures of said first tab, each two aligned apertures defining a respective one of said throughways.

7. The combination of claim 3 wherein said extension means comprises a first pair of plate-like tabs disposed generally at opposite sides of said connection portion, said tabs extending generally inwardly toward said main portion of said valve body and each having an aperture therethrough, each of said apertures at least partially defining a respective one of said throughways.

8. The combination of claim 7 further comprising a second pair of plate-like tabs each aligned with and longitudinally spaced from a respective one of the tabs of said first pair, each of said tabs of said second pair having an aperture therethrough, the apertures of each two aligned tabs also being aligned and defining a respective one of said throughways.

9. The combination of claim 3 wherein said extensions are comprised of respective side portions of said plate-like member each curved to form an eyelet defining a respective one of said throughways.

10. The combination of claim 1 wherein the effective longitudinal extend of each of said throughways is substantially as great as the longitudinal extent of said main portion of said valve body along the centerline of said flowway.

* * * * *

UNITED STATES PATENT AND TRADEMARK OFFICE
CERTIFICATE OF CORRECTION

PATENT NO. : 4,079,746
DATED : March 21, 1978
INVENTOR(S) : Henry Killian

It is certified that error appears in the above-identified patent and that said Letters Patent are hereby corrected as shown below:

In Column 1, line 52, delete the word "is" first occurrence and insert therefor --in--.

In Column 5, line 10, delete the number "34" and insert therefor the number --24--.

In Column 8, line 30, delete the word "extend" and insert therefor --extent--.

Signed and Sealed this

Twenty-fourth Day of October 1978

[SEAL]

Attest:

RUTH C. MASON
Attesting Officer

DONALD W. BANNER
Commissioner of Patents and Trademarks